June 29, 1937.  J. H. FRIDÉN  2,085,078
METHOD OF AND APPARATUS FOR FORMING SLUGS AND EXTRUDING THE SAME
Filed Jan. 5, 1934  4 Sheets-Sheet 3
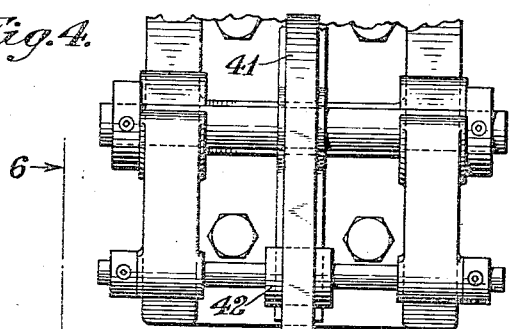
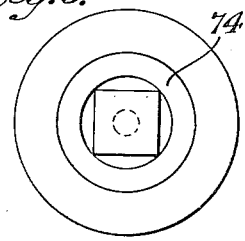
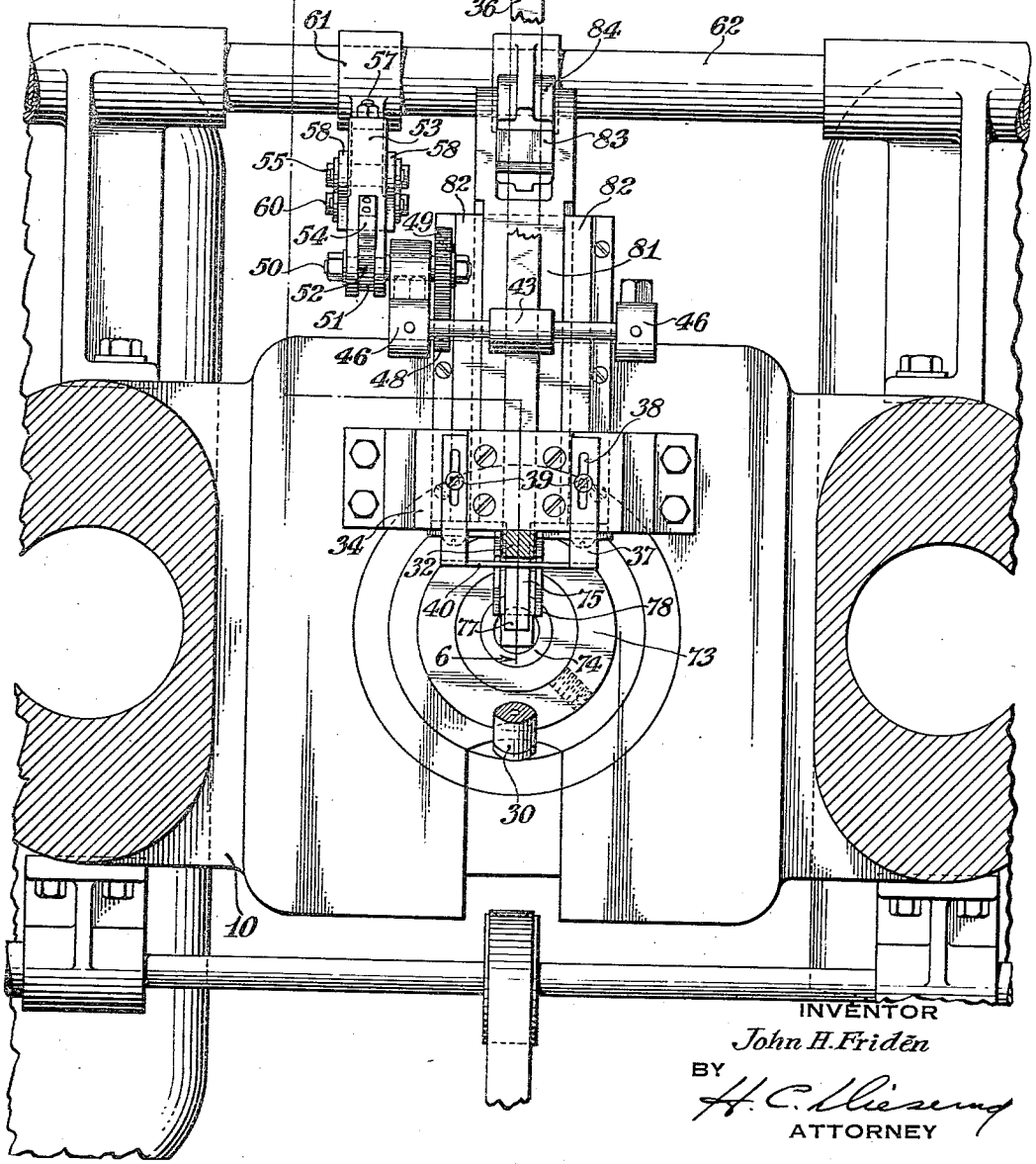
INVENTOR
John H. Fridén
BY
H. C. Liesung
ATTORNEY June 29, 1937.  J. H. FRIDÉN  2,085,078
METHOD OF AND APPARATUS FOR FORMING SLUGS AND EXTRUDING THE SAME
Filed Jan. 5, 1934  4 Sheets-Sheet 4
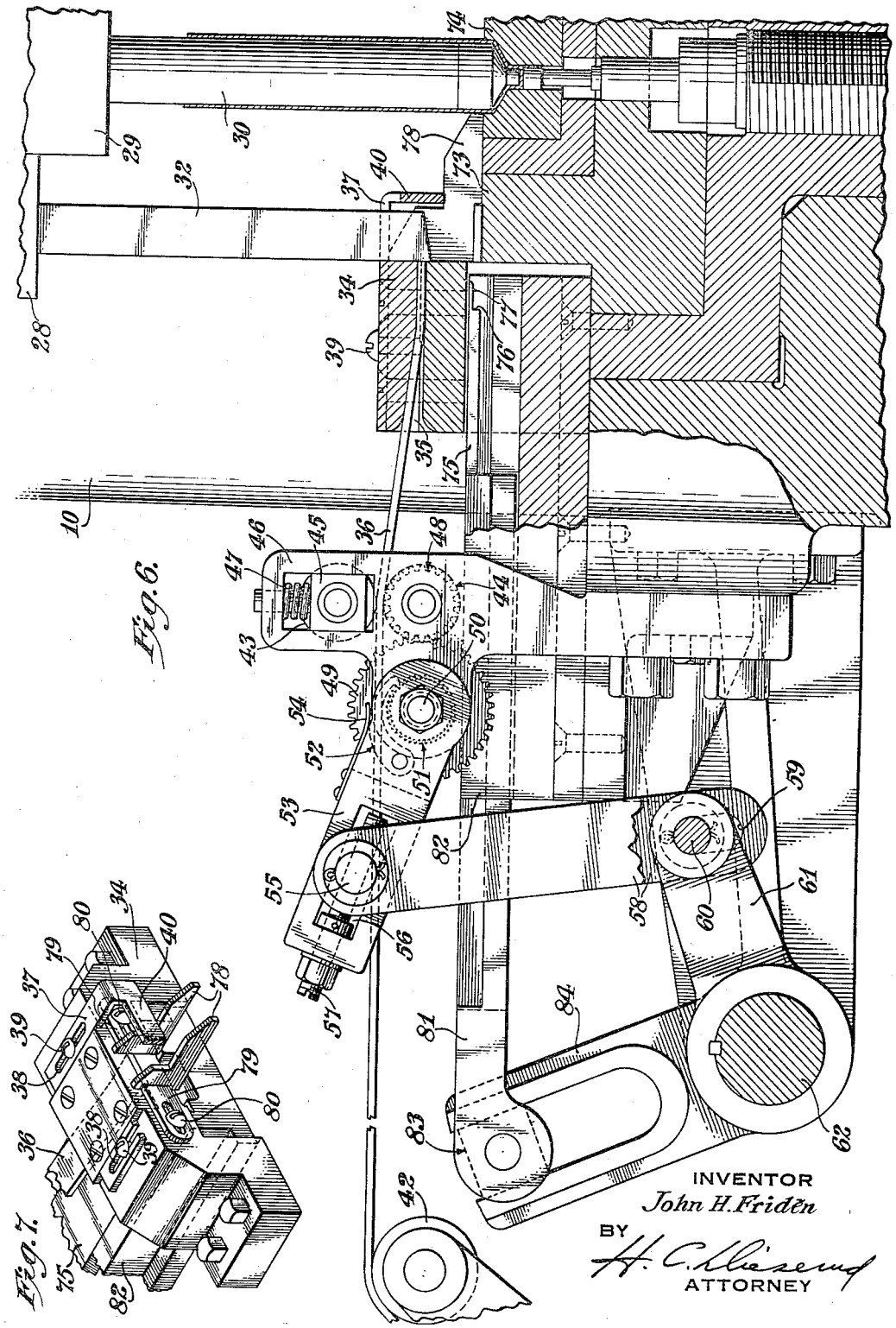
INVENTOR
John H. Fridén
BY
H. C. Lieseng
ATTORNEY Patented June 29, 1937

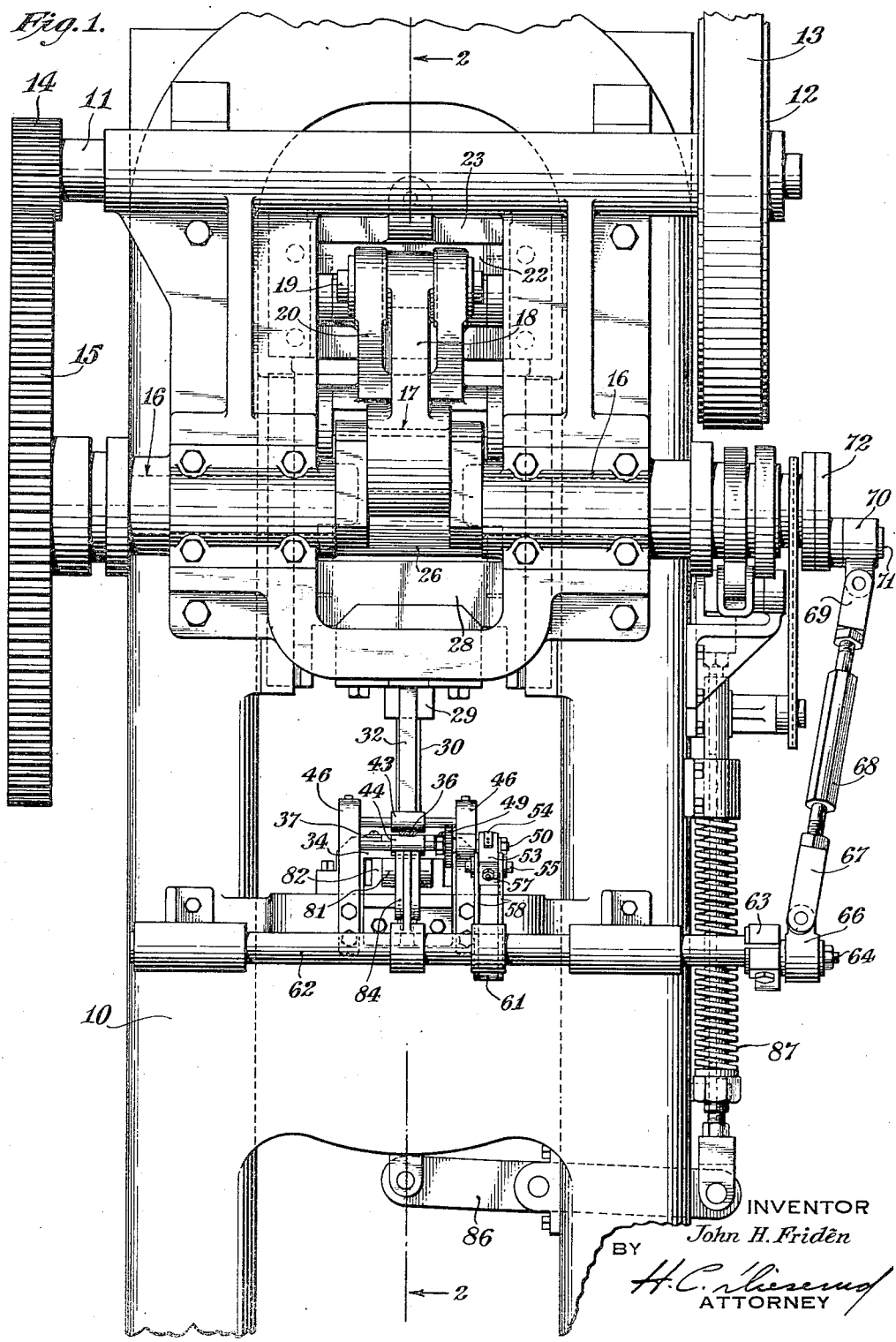

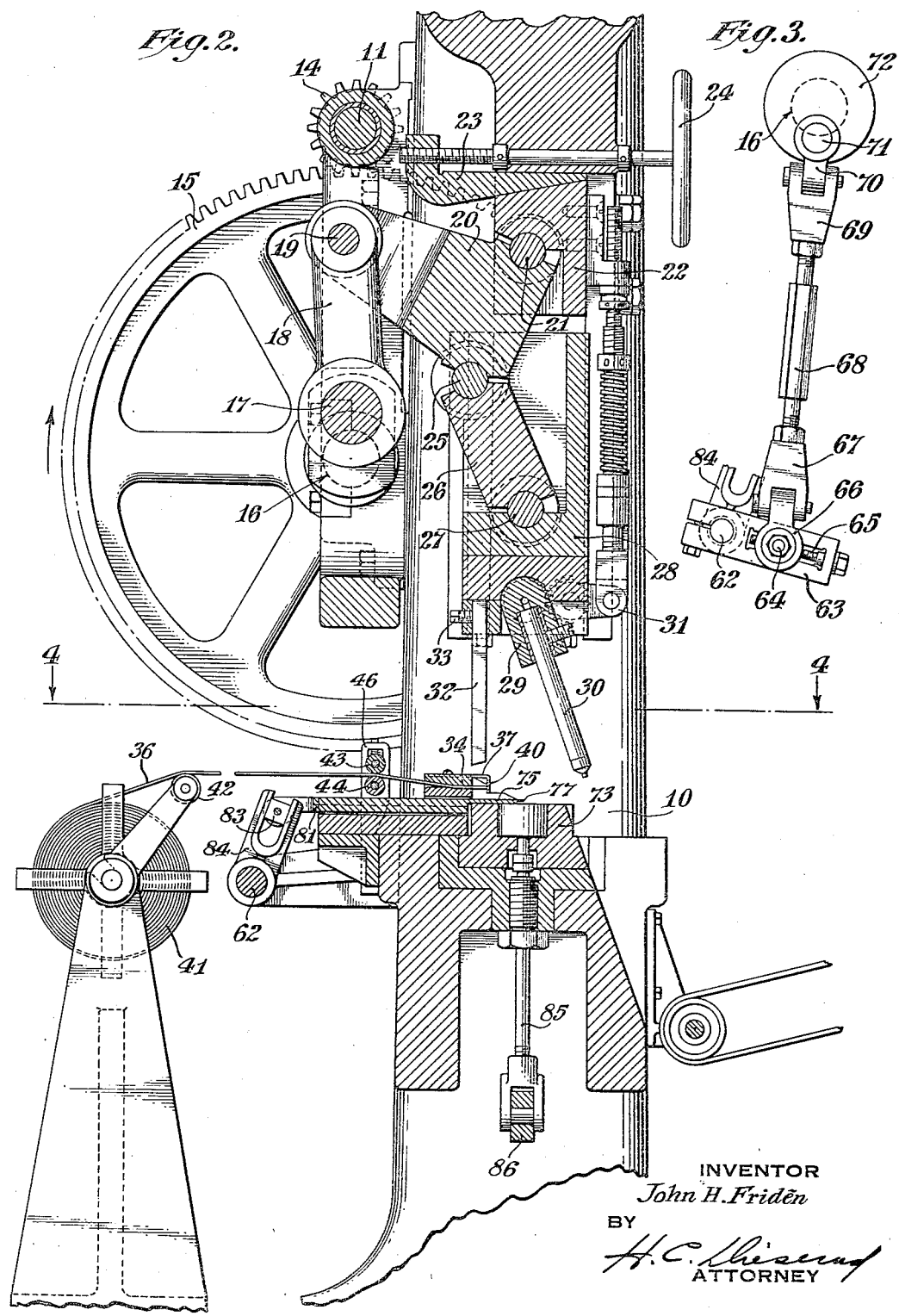

2,085,078

UNITED STATES PATENT OFFICE 2,085,078

METHOD OF AND APPARATUS FOR FORMING SLUGS AND EXTRUDING THE SAME

John H. Fridén, East Orange, N. J., assignor to The Sun Tube Corporation, Hillside, N. J., a corporation of New Jersey Application January 5, 1934, Serial No. 705,371

9 Claims. (Cl. 207—9)

This invention relates to a method and apparatus for carrying out the method of forming extruded articles. It is particularly related to the production of collapsible tubes of the type commonly employed in the sale of tooth paste, shaving creams, adhesive substances and the like, although it may be applied to the production of other forms of extruded articles also. Tubes of the character specified are ordinarily formed of a relatively soft metal such as pure tin or lead or alloys of soft metals, depending upon the particular use to which the tube is to be put. It will be understood, however, that the invention relates more broadly to the production of various extruded articles from any readily extrudable material.

Heretofore it has been the practice in the production of collapsible tubes and the like to utilize preformed, flat, circular discs of metal which are fed from a hopper through a chute and by suitable feed devices into the extrusion die. These discs or slugs are either cast or stamped from a large sheet. When they are cast their upper surfaces are usually irregular and there is danger, due to these irregularities and to oxidation of the surface, that cracks and other defects will develop in the walls of the extruded tubes. Furthermore the individual casting of each slug is expensive. When the slugs are stamped or punched from a large sheet there is left an excessive amount of scrap metal which is either wasted or must be remelted and again formed into a sheet. This adds considerably to the expense of this method of forming the slugs.

A feature of the present invention is in the formation of slugs to be extruded by the simple shearing of small sections from a narrow ribbon of material of just the desired width. For the extrusion of tubes the small sections should preferably be substantially square in area and of sufficient size and thickness to form a tube of the desired dimensions. By cutting these sections from a narrow band or ribbon or strip the production of scrap in the formation of the slugs has been completely eliminated.

It has been thought necessary, heretofore, to provide a circular slug to produce a cylindrical tube. I have discovered, however, that a square slug of the character mentioned may be used just as effectively as a circular one. The only effect of the corners on the slug is to produce corresponding high points along the free edge of the extruded tube. These high points will not ordinarily be more than a quarter or three eighths of an inch beyond the intervening low points. Even a tube formed from a circular slug will have some irregularity at its free edge and therefore all such tubes require a certain amount of trimming to provide an even edge as well as to yield a tube of desired, definite length. Accordingly a square slug is just as satisfactory for extrusion as a circular one. In fact the slug need not be precisely square but may be somewhat longer in one dimension or it may be of some peculiar or irregular form so long as it is reasonably symmetrical and not too narrow in relation to its length.

A further advantage of the present invention is that it enables the production of slugs adjacent to the point at which they are to be extruded. This makes it possible to eliminate the hopper and chute constructions ordinarily required in conjunction with extrusion presses. The ribbon of material may simply be wound upon a reel and fed first to a suitable shearing device and the severed sections may then be fed successively to the die. A considerable simplification of the mechanism is made possible in this way in addition to the economy of materials previously pointed out.

A particular object of the invention has been to devise a simple and economical construction embodying the foregoing features always reliable in its action and capable of rapid operation.

Other objects and advantages of the invention will become apparent from a detailed description of an illustrative embodiment of the invention that will now be given in conjunction with the accompanying drawings in which:

Figure 1 is a rear elevation of the principal portion of a machine embodying the features of the present invention.

Figure 2 is a vertical section along the line 2—2 of Figure 1.

Figure 3 is a detail view in elevation showing a connection between a pair of shafts in the machine.

Figure 4 is an enlarged horizontal section taken along the line 4—4 of Figure 2.

Figure 5 is an enlarged detail view in plan of the die, showing a slug in position for extrusion.

Figure 6 is an enlarged vertical section taken along the line 6—6 of Figure 4, but showing certain of the parts in a different position, and Figure 7 is a perspective view of a detail of the slug-forming mechanism.

Referring now to the drawings, the machine includes a framework 10 adapted to be supported from the floor or a suitable foundation in the building in which the machine in installed and of sufficient dimension and strength to withstand the shocks and stresses incident to the operation of the machine. At a convenient point on the frame, there may be provided in suitable bearings a shaft 11 carrying a pulley 12 adjacent one end, adapted to be driven by a belt 13 connected with any suitable source of power. If desired, the belt and pulley might be replaced by an individual motor for driving the various parts of the machine. At the opposite end of the shaft 11 there is provided a pinion 14 meshing with a large gear 15 secured to a shaft 16. At substantially its midpoint the shaft 16 is provided with an eccentric portion 17 carrying a connecting rod 18 which is pivotally attached by means of a pin 19 to one member 20 of a toggle mechanism. The member 20 is pivotally mounted by means of a pin 21 in a block 22 held stationary within the frame of the machine but adjustable slightly in a vertical direction by means of a wedge 23 movable in or out by the rotation of a handwheel 24. It will be apparent that by suitable adjustment of the wedge 23 in this way, the field of action of the toggle mechanism in a vertical direction may be varied to suit the particular requirements. A pin 25 serves to join the toggle member 20 with a lower toggle member 26, which is pivotally attached by means of a pin 27 to a vertically slidable head 28.

Pivotally attached to the bottom of the head is a punch holder 29 adapted to be rocked through an angle of between 20 and 30 degrees during the reciprocation of the head. A punch 30 is mounted in the holder and may be detachably held in place by means of a setscrew, or the like. Suitable mechanism for rocking the holder during the reciprocation of the head is designated generally by the reference numeral 31. This mechanism is described in detail in my pending application Serial No. 650,850 filed January 9, 1933, issued December 10, 1935 as Patent Number 2,023,879 and therefore need not be described further here. Any other suitable mechanism for accomplishing the same purpose might be substituted.

Also secured to the bottom of the head 28 is a cutter or shearing tool 32 which may be held in place by means of a setscrew 33. Referring now particularly to Figure 6, it will be seen that the cutter 32 cooperates with a shearing block 34 having a passage 35 through which the ribbon or strip of material 36 to be severed into slugs may be passed. To facilitate the introduction of the ribbon of material 36, the intake side of the opening 35 may be flared or belled in the manner indicated. The arrangement is such that as the cutter 32 descends, its cutting edge will slide along the end of the shearing block 34 and sever any portion of the material that protrudes beyond the end of the shearing block. A bracket 37 may conveniently be adjustably mounted upon the block 34. This bracket may be of generally U-shape, the arms being provided with elongated slots 38 cooperating with screws 39 by means of which the bracket may be clamped in any adjusted position. The cross member 40 of the bracket is bent downwardly to extend across the discharge end of the passage 35. The arrangement is such that when the ribbon of material 36 extends beyond the shearing block and engages the cross member 40, a slug of the appropriate size will be formed upon the reciprocation of the cutter 32. Variation in the distance between the cross member 40 and the end of the shearing block, in accordance with the length of slug desired, may be readily effected by means of the slots 38 and screws 39.

Suitable mechanism for feeding the ribbon of material, such as pure tin or the like, from a reel 41, or other suitable source of supply, is provided. The material as it is drawn from the reel may be first led over an idler roller 42 and then between a pair of feed rollers 43 and 44. Intermediate the idler and the feeding rollers there may be provided, if desired, any suitable form of straightening means for removing the curvature imparted to the ribbon in winding it upon the reel 41. Furthermore, it will be understood that any suitable arrangement, such as a brake of appropriate construction, may be employed for preventing the too rapid turning of the reel 41 as the material is drawn from it. The upper feed roller 43 is preferably mounted in bearing blocks 45 at its opposite ends, slidable in suitable openings in frame members 46. Springs 47 co-acting between portions of the frame members and the blocks 45 force the latter downwardly against the lower roller, or the ribbon of material, under suitable pressure. At one end of the roller 44 there is provided a pinion 48 which meshes with a gear 49 secured to a stub shaft 50 mounted in suitable bearings on one of the frames 46. A ratchet wheel 51 secured to the shaft 50 is engaged by a pawl 52 pivotally mounted on a member 53. The member 53 is pivotally supported by the shaft 50 and carries a leaf spring 54 normally urging the pawl 52 into engagement with the ratchet 51. It will be apparent that as the member 53 is rocked about its pivot in a counter-clockwise direction (Fig. 6), the pawl will rotate the ratchet while clockwise movement of the member simply carries the pawl idly over the teeth of the ratchet.

A pin 55 is preferably adjustably mounted within an opening 56 in the member 53. The position of the pin 55 longitudinally of the member 53 may be varied by means of a screw 57. This arrangement, as will be apparent from the following description, permits a suitable variation in the feeding movement of the roller 44 upon each operation of the machine so as to vary the length of the slug formed upon each operation. Pivotally carried by the pin 55 are the upper ends of a pair of links 58 which at their lower ends are connected by means of an elongated slot 59 with a pin 60. This pin is carried by an arm 61 secured to a shaft 62 and adapted to be rocked upon the turning of this shaft. For the purpose of rocking shaft 62, there is secured adjacent one end an arm 63, best shown in Figs. 1 and 3. This arm is arranged to carry a pin 64 adjustable longitudinally of the arm by means of a screw 65. This, as will presently become apparent, allows for suitable variation in the arc of rotation of the shaft 62.

A collar 66 carried by the pin 64 has pivotally connected thereto a yoke 67 at the lower end of a link 68. The upper end of this link is connected by a yoke 69 and an attached collar 70 to an eccentric pin 71 carried by a disk 72 secured to the shaft 16. It will be seen that through the connections explained, each rotation of the shaft 16 will produce an oscillation of the arm 63 and a rocking of the shaft 62 to an extent depending upon the adjustment of the pin 64. The rocking of the shaft 62 in turn causes a rocking of the member 53 after a brief idle movement provided by the slots 59. Rocking of the member 53 in this way to the extent provided by the adjustment of the pin 55 causes rotation of the lower feed roller 44 to advance the material the desired extent. Any suitable means may be provided, if desired, to cause the feed rollers to grip the ribbon of material more effectively. The stop 40 will preferably be adjusted to correspond with the extent of feed of the material upon each rotation of the shaft 16. If desired, however, the arrangement may be such that a slight additional feed is provided for by the feed mechanism and the rollers are then simply permitted to slip relative to the ribbon of material when the end of the ribbon engages the stop 40.

When a slug is severed from the end of the ribbon of material, in the manner explained, it drops upon the upper surface of a die holder 73. Suitable means are then provided for transferring the slug from a point directly below the cutter 32 to the opening in a die 74. This means may comprise a longitudinally shiftable pusher element 75 having a shoulder 76 adapted to engage the edge of the slug while a finger or extention 77 at the end of the element engages the top surface of the slug. The element 75 is reciprocated, by connections to be presently described, and after engaging the slug in the manner indicated, slides it along the upper surface of the die holder to a point directly over the opening in the die. It will be understood that the extension 77 tends to hold the slug in a horizontal position until it is substantially centrally located over the opening in the die. A pair of guide fingers 78 is provided, one at either side of the path of movement of the slug, so as to insure the correct positioning of the slug over the die opening. These fingers may be adjustably mounted upon the block 34 by means of laterally extending portions 79 having elongated slots cooperating with screws 80. In this way the guide fingers may be shifted further apart or closer together, as required, to properly accommodate slugs of different dimensions. The spacing of the fingers will, of course, be determined by the width of the ribbon of material from which the slugs are being formed.

For the purpose of reciprocating the element 75 in the manner explained, it may be formed integral with or otherwise secured to one end of a slide member 81 adapted to shift longitudinally between retaining and guiding elements 82 (Fig. 4). The opposite end of the slide 81 is forked and has a block 83 of substantially cubical form pivotally mounted between the branches of the fork. The block 83 is received by U-shaped jaws formed on an arm 84 secured to the rock shaft 62. It will be seen, therefore, that as the rock shaft is oscillated, in the manner previously explained, the arm 84 will shift the slide 81 and the pusher element 75 to advance a slug from the position shown in Fig. 6 to the position shown in Figs. 2 and 4, and the pusher element will then be retracted to the position shown in Fig. 6 so that a new slug may be severed and dropped upon the surface of the die holder for a repetition of the same operation.

The operation of the machine may be briefly summarized as follows: Power is supplied to the machine through the pulley 12 and belt 13. This causes rotation of shaft 16, which, upon each complete revolution, causes its eccentric portion 17 to operate the toggle members 20 and 26 and thereby reciprocate the head 28. As the head descends, the punch 30 will be shifted from its inclined position, shown in Fig. 2, to a vertical position and upon continued downward movement, it will engage the slug then in the die opening and will cause it to be extruded in the form of a tube surrounding the punch. At the same time the cutter 32 will sever a section of the ribbon 36 and drop it upon the upper surface of the die holder. By the connections shown in Fig. 3, the rock shaft 62 will be oscillated in such timed relation with respect to the movement of the head 28 that the slide 81 will be shifted toward the right, in Fig. 6, as the punch head begins to rise. Shortly thereafter, when the cutter 32 has been lifted above the opening 35 in the block 34, the pin 60 mounted in arm 61 will engage the lower ends of slots 59 in links 58 and thus commence the feeding of the ribbon of material 36 to present a new section in the path of the cutter 32. While this feeding movement takes place, the slide 81 continues to advance to deposit the previously severed slug in the die opening. The timing of the parts is preferably such that before the cutter 32 again descends to the point where it completely severs the next slug from the end of the ribbon, the pusher element 75 will have been almost completely retracted. Should it be found desirable, however, in some machine where a different timing relation is made necessary, the new slug when severed might simply be permitted to drop upon the upper surface of the element 75 and then upon retraction of the latter drop further to the surface of the die holder.

It will be understood that the details of the extrusion punch and related mechanism may be varied considerably to suit particular requirements. Excellent results may be obtained by the use of the type of mechanism illustrated and more fully described in my before mentioned pending application. This mechanism includes a retractable element 85 at the bottom of the die operated by a lever 86 and spring and cam mechanism, designated generally by the reference character 87, to relieve the pressure of the point of the punch upon the center of the slug and also to serve as a knockout for the extruded tube as the punch is raised. During the upward movement of the punch, it is rocked into the position indicated in Fig. 2, in which position the tube may be removed by the admission of air into the interior of the punch, in the manner explained in the pending application.

While an illustrative machine embodying the features of the invention has been disclosed in considerable detail, it will be understood that numerous variations may be made in the form and arrangement of the several parts without departing from the general spirit and scope of the invention.

What I claim is:

1. A method of producing a thin walled, tubular article which comprises feeding a narrow, flat strip of material adapted to be extruded, severing a section completely across the end of said strip of suitable size to form the article, immediately transferring the severed section and dropping the same in a die, and forcing a punch into said die under sufficient pressure to extrude the material in tubular form.

2. In extruding apparatus, means for severing a strip of material into sections, means for feeding a strip of material to said severing means, a die, means for transferring said sections as they are severed, in the direction in which said strip is fed and dropping the same into the die, means cooperating with said die for extruding the severed sections into tubular form, and a member connected with said severing means and said extruding means for operating the same in unison.

3. In a machine of the class described a reciprocatory head, severing means carried by said head, a punch carried by said head, a die cooperating with said punch, means for feeding a strip of material to said severing means to cut said strip into sections, an adjustable stop for limiting the feed of said strip to determine the length of said sections, and means for feeding said sections to said die for extrusion.

4. In a machine of the class described a reciprocatory head, severing means carried by said head, a punch carried by said head, a die cooperating with said punch, means including feed rollers for supplying a strip of material to said severing means to be cut into sections, and means including a reciprocatory slide beneath said feed rollers and operable in the direction in which the strip is fed for transferring said sections to the die for extrusion.

5. In a machine of the class described a reciprocatory head, severing means carried by said head, a punch carried by said head, a die cooperating with said punch, means including feed rollers for supplying a strip of material to said severing means to be cut into sections, means including a reciprocatory slide operable in the direction in which said strip is fed for transferring said sections to the die for extrusion, and means for operating said feed rollers and said slide in unison.

6. A method of producing a collapsible metal tubular article comprising successively feeding a flat strip of metal to be extruded a predetermined distance, completely severing an end section from said strip to form a slug of suitable size, pushing said slug directly into alinement with a die, and extruding the slug in said die into the form of a tubular article.

7. A method of producing a collapsible metal tubular article comprising successively feeding a flat strip of metal to be extruded to a position adjacent a die, completely severing an end section of said strip to form a slug of suitable size, transferring said severed slug directly into said die, and extruding the slug in said die into the form of a hollow article.

8. In apparatus for extruding thin walled tubular articles, means for severing a strip of metal into short sections, means for feeding a flat narrow strip of metal to said severing means, a die, means for transferring said sections to said die after each severing operation, and a punch for cooperating with said die to extrude said sections into tubular articles.

9. In apparatus for extruding thin walled tubular articles, means for severing a strip of metal into short sections, means for feeding a flat narrow strip of metal to said severing means, a die, means acting in the direction of travel of said strip for transferring said sections to the die after each severing operation, a punch cooperating with the die to extrude said sections, and a member for operating both said feeding and transferring means.

JOHN H. FRIDÉN.